Figure 1:
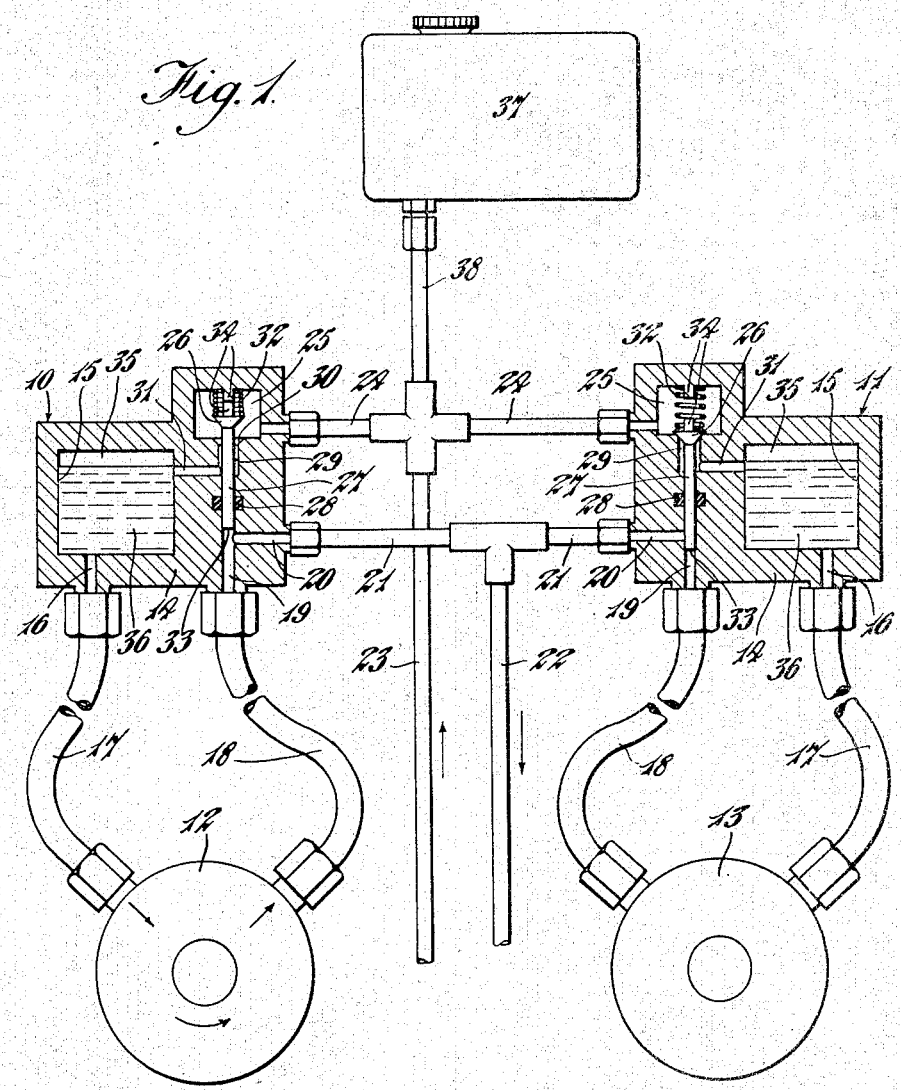

June 3, 1941.  S. M. PARKER  2,243,918

LIQUID PUMPING SYSTEM

Filed Oct. 2, 1940

Sydney MacDonald Parker
Inventor
by M. W. McConkey
Atty.

Patented June 3, 1941

2,243,918

UNITED STATES PATENT OFFICE 2,243,918

LIQUID PUMPING SYSTEM

Sydney Macdonald Parker, London, England, assignor to Automotive Products Company Limited, London, England Application October 2, 1940, Serial No. 359,455
In Great Britain September 25, 1939

11 Claims. (Cl. 103—40)

This invention relates to liquid pumping systems, and particularly to those which are used for providing hydraulic power for operating liquid pressure remote control systems.

It is the object of the present invention to provide improvements for safeguarding the supply of working liquid in the event of a leakage occurring in the pump or the connections associated therewith. It will be apparent that should such a leakage occur in a system of the ordinary kind it is extremely probable that the contents of the usual reservoir would rapidly be lost, thus putting out of action any other pump or apparatus which is fed from the same reservoir.

According to the present invention there is provided for a liquid pressure pumping system, a valve device to avoid loss of liquid in the event of a leakage occurring in the pump or its connections, said valve device comprising a body formed with a pair of mutually isolated passageways for inclusion in the inlet and delivery connections of the pump, respectively, a valve member urged to close both of said passageways, and a plunger or equivalent member arranged to be subject to the pressure delivered by the pump and to operate the valve member so as to open both of the passageways when a predetermined delivery pressure is attained. Preferably an auxiliary reservoir is connected with the inlet passageway so as to provide a limited supply of liquid when the pump is being started. Also a non-return air inlet valve may be provided to form a communication between the inlet connection of the pump and the atmosphere, so as to allow liquid within the inlet connection to flow into the pump and so have its pressure raised to a value sufficient to open the valve device controlling the main supply of liquid in the reservoir.

In a liquid pressure pumping system comprising a reservoir for working liquid, and a pump which receives liquid therefrom and delivers it under pressure, according to a further feature of the invention a valve device is provided which normally tends to close so as to isolate the reservoir from the pump inlet, but which is operated by the delivery pressure of the pump, and is caused to open when said delivery pressure attains a predetermined value.

Thus the improved liquid pumping system may comprise in combination a reservoir for working liquid, a pump which receives liquid from said reservoir and delivers it under pressure, a valve closing the connection between the reservoir and the pump, a valve closing the delivery connection of the pump and interconnected for operation simultaneously with the valve in the inlet connection, means which are arranged to open both of said valves when the pressure of the liquid delivered by the pump attains a predetermined value, and an auxiliary reservoir which feeds the inlet connection of the pump with liquid while pressure is being built up during starting.

If desired a mushroom valve may be provided in the inlet connection, said valve being arranged so that its stem serves as the valve in the delivery connection, the end surface of the stem conveniently being acted upon by the pressure in the delivery connection of the pump. The delivery of the pump may conveniently be connected with an L-shaped passageway, that limb of which nearer the pump is blocked by the end of the stem of the mushroom valve so that liquid pressure from the pump when the latter is working displaces the mushroom valve axially until the end of the stem moves beyond the other limb of the L-shaped passageway. Where an auxiliary reservoir is provided in connection with the inlet of the pump, said reservoir may comprise a closed chamber having an inlet for liquid disposed below its upper part so that a quantity of air is trapped and serves to urge the liquid contents of the auxiliary reservoir into the pump when the latter is being started.

Figure 2:
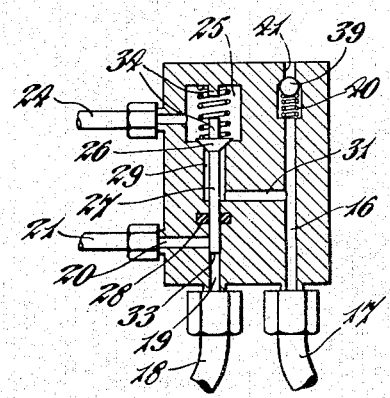

The invention is illustrated by way of example in the accompanying diagrammatic drawing, in which:

Figure 1 shows a system having two pumps each associated with an improved valve device; and Figure 2 is a sectional view of a modified form of valve device.

The system shown in Figure 1 is intended to supply with pressure liquid a double-acting remote control system, such, for example, as is commonly installed upon an aircraft for operating the retractable undercarriage, the wing flaps and various other devices disposed remotely from the pilot's cabin. In such systems it is usual to provide a single reservoir for feeding and/or replenishing the pumps. The latter, moreover, are disposed upon or adjacent the engines of the aircraft and in view of the vibration and other factors there is some risk of the connections leading to and from the pump becoming cracked, broken, or otherwise rendered leaky. In order to safeguard the supply of working liquid in the reservoir, there is provided in connection with each of the pumps a valve device, which devices are indicated generally at 10 and 11 respectively in Figure 1 and which correspond with engine-driven pumps 12 and 13.

The valve devices 10 and 11 are of identical construction and only one need be described. It comprises a body 14 having a relatively large closed cavity 15 which, at its bottom part, communicates by way of a passageway 16 with the inlet connection 17 of the corresponding pump 12 or 13, said connection 17 being shown in the form of a flexible pipe. A delivery connection 18 from the pump leads to a bore 19 forming one limb of an L-shaped passageway, the other limb of which is indicated at 20 and is connected by a pipe 21 with a pipe line 22 serving to carry the pressure liquid to the selector valves and motor units (not shown) of the remote control system. The liquid which is rejected by the motor units returns through a pipe line 23 and after passing through a pipe connection 24 enters a cavity 25 in the body 14 of the valve device 10, assuming, of course, that the corresponding pump 12 or 13 is being driven at the time. A mushroom valve 26 has a stem 27 which is slidably mounted within an extension of the bore 19, liquid leakage along said stem being prevented by a rubber or other packing ring indicated at 28. The upper part of the bore 19 is enlarged in diameter to form a space 29 below the seating 30 for the mushroom valve 26 and this space 29 is connected by a passage 31 with the auxiliary reservoir constituted by the cavity 15. The mushroom valve 26 is urged on to its seating by a coiled compression spring 32 and, as will be seen from the valve device 11, the stem 27 of the mushroom valve is of such a length that when the valve 26 is closed the lower part of said stem 27 completely blocks the end of the limb 20 of the L-shaped passageway forming part of the delivery conduit from the pump. The end surface of the stem 27, indicated at 33, is, however, subject to the pressure of the liquid issuing from the delivery connection 18, and when a predetermined pressure less than the normal working pressure of the pump is developed the mushroom valve 26 is lifted to a position in which the end of the passageway 20 is completely open. Excess lifting movement of the valve 26 is prevented by the co-engagement of a pair of stops 34 upon the valve 26 and the body 14 respectively.

The passageway 31 enters the cavity 15 some distance below its uppermost point, so that a volume of air indicated at 35 becomes trapped above the liquid 36. The main reservoir of the system is indicated at 37 and feeds liquid through a pipe 38 leading into the connections 24 and the main return pipe line 23.

The operation of the valve devices 10 and 11 is as follows: The pump 13 is represented as being at rest, with the result that there is insufficient pressure within the bore 19 of the valve device to support the mushroom valve 26, which latter is therefore closed under the influence of its spring 32. The head portion of the valve 26 thus completely shuts off the main reservoir 37 from the inlet connection 17 of the pump 13, and at the same time the lower end of the stem 27 of said valve member 26 prevents pressure liquid in the pipe line 22 from entering the delivery connection 18 of the idle pump 13. When the pump 13 is started up a partial vacuum tends to be created in the inlet connection 17 and the liquid 36 within the cavity 15 flows into the pump partly or completely under the action of the trapped volume of air 35, which, of course, expands as the pressure of the liquid diminishes. In the meantime the pressure of the liquid in the delivery connection 18 rapidly increases owing to the action of the pump, thus raising the mushroom valve 26 as above described by acting upon the underneath surface 33 of the stem 27 thereof. As the head of the valve 26 rises off its seating liquid can flow freely into the cavity 15 from the reservoir 37 and the pump comes into full operation, as is shown in the case of the pump 12 and valve device 10 in Figure 1.

If either the inlet connection 17 of the outlet connection 18 of either of the pumps should break or develop a serious leak, or if a leak should occur in the casing of the pump itself, said pump, although it continues to be driven, will fail to deliver liquid into the bore 19 of the corresponding valve device at a pressure sufficiently great to lift the mushroom valve 26. As a result the valve 26 will remain closed and the contents of the reservoir 37 will be prevented from escaping through the faulty pump installation. The supply of reserve liquid from the reservoir 37 is thus safeguarded, and if one of the pumps or its connections should fail the other pump can continue to operate in an efficient manner. If the inlet connection 17 should break, the pump will tend to pump air, but the pressure delivered will be considerably lower than when liquid is being pumped. The spring 32 should, of course, be sufficiently strong to keep the valve 26 closed whenever the pump is delivering air.

A somewhat modified form of valve device is shown in Figure 2. The construction of the mushroom valve 26 and the manner in which the lower end of its stem 27 obstructs the L-shaped passageway, 19, 20 are the same as before, but instead of providing an auxiliary reservoir in the form of the cavity 15, the passageway 16 leading to the inlet connection 17 is extended upwardly to a non-return ball valve 39 which is normally urged by a spring 40 so that it closes an aperture 41 leading to the atmosphere. The passageway 16 connects directly with the passageway 31 so as to carry the main supply of liquid from the connection 24 when the corresponding pump is in operation. At starting, however, the reduction of the pressure in the inlet of the pump causes the non-return valve 39 to open, thus admitting atmospheric air and permitting the liquid in the passageway 16 to flow into the pump. If desired a non-return air inlet valve such as that indicated at 39 may be incorporated in each of the valve devices 10 and 11 shown in Figure 1 in addition to the auxiliary reservoir constituted by the cavity 15. The modification shown in Figure 2 is most suitable where the inlet connection 17 is relatively long and consequently contains a sufficient quantity of liquid to enable the pump to build up the requisite pressure in the delivery connection 18.

It will be appreciated that the improved valve device may be constructed in many ways other than that described, and that various forms of valve member may be devised to operate for producing the desired effect of cutting off the reservoir in the event of a failure occurring in the pump or in the pipe lines associated therewith. Further, the auxiliary reservoir may be arranged separately from the valve device, and it can if desired be constituted by a liquid space disposed within or forming part of the main reservoir. The improved valve device is particularly simple in construction, and is primarily intended for use on multi-engine aircraft where a separate pump is provided upon each of a plurality of engines, said pumps being fed from a common reservoir and being adapted to deliver through a common pipe line feeding one or more hydraulic accumulators, or feeding a remote control system through the medium of a pressure regulating valve or other device.

What I claim is:

1. For a liquid pressure system having a pump, a valve device comprising a body formed with a pair of mutually isolated passageways for inclusion in the inlet and delivery connections of the pump respectively, a valve member urged to close both of said passageways, a plunger arranged to be subject to the pressure delivered by the pump and to operate the valve member so as to open both of the passageways when a predetermined delivery pressure is attained, and an auxiliary reservoir connected with the inlet passageway to provide a limited supply of liquid when the pump is being started.

2. For a liquid pressure system having a pump, a valve device comprising a body formed with a pair of mutually isolated passageways for inclusion in the inlet and delivery connections of the pump respectively, a valve member urged to close both of said passageways, a plunger arranged to be subject to the pressure delivered by the pump and to operate the valve member so as to open both of the passageways when a predetermined delivery pressure is attained, and a non-return air inlet valve which forms a communication between the inlet connection of the pump and the atmosphere so as to provide a limited supply of liquid when the pump is being started.

3. A liquid pumping system comprising in combination a reservoir for working liquid, a pump which receives liquid from said reservoir and delivers it under pressure, a valve closing the connection between the reservoir and the pump, a valve closing the delivery connection of the pump and inter-connected for operation simultaneously with the valve in the inlet connection, means which are arranged to open both of said valves when the pressure of the liquid delivered by the pump attains a predetermined value, and an auxiliary reservoir which feeds the inlet connection of the pump with liquid while pressure is being built up during starting.

4. A liquid pumping system comprising a reservoir for working liquid, a pump which receives liquid therefrom and delivers it under pressure, a valve device between the reservoir and pump which normally tends to close so as to isolate the reservoir from the pump inlet but which is operated by the delivery pressure of the pump and is caused to open when said delivery pressure attains a predetermined value, and a chamber serving as an auxiliary reservoir connected with the inlet of the pump to supply a limited quantity of liquid thereto while pressure is being built up during starting.

5. In a liquid pressure system, the combination of a pump having an inlet and delivery connection with a valve device comprising a body formed with a pair of mutually isolated passageways for inclusion in the inlet and delivery connections of the pump respectively, a valve member urged to close both of said passageways, a plunger arranged to be subject to the pressure delivered by the pump and to operate the valve member so as to keep open both of the passageways so long as a predetermined delivery pressure is maintained, and means for storing liquid between the valve member and the pump inlet.

6. A liquid pumping system comprising a reservoir for working liquid, a pump which receives liquid therefrom and delivers it under pressure, a valve device which normally tends to close so as to isolate the reservoir from the pump inlet but which is operated by the delivery pressure of the pump and is caused to open when said delivery pressure attains a predetermined value, and means for storing liquid between the valve device and the pump inlet.

7. A liquid pumping system comprising in combination a reservoir for working liquid, a pump which receives liquid from said reservoir and delivers it under pressure, a valve body connected between the reservoir and the pump and having a pair of mutually isolated passageways for inclusion in the inlet and delivery lines of the pump respectively, one of the passages being substantially L-shaped, a valve member having a head urged to close one of said lines and a stem which at times blocks the L-shaped passage, the end of the stem being adapted to receive liquid pressure from the pump when the latter is working so that such pressure displaces the mushroom valve to open the L-shaped passage, and means for storing liquid between the valve member and the pump inlet.

8. A liquid pumping system comprising in combination a reservoir for working liquid, a pump having an inlet connected to the reservoir and an outlet for delivering fluid under pressure, and a valve having a head and stem, the head being adapted to disconnect the pump from the reservoir and normally being urged to its closed position by the pressure head of the liquid in the reservoir, the stem being adapted to close the pump outlet and to receive at one end thereof the pressure of the liquid delivered by the pump, and means for storing liquid between the valve and the pump inlet.

9. In combination, a reservoir for working liquid, a pump which receives liquid from said reservoir and delivers it under pressure, a valve closing the connection between the reservoir and the pump, a valve closing the delivery connection of the pump and interconnected for operation simultaneously with the valve in the inlet connection, means arranged to open both of said valves when the pressure of the liquid delivered by the pump attains a predetermined value, and a source of liquid supply which feeds the inlet connection of the pump while pressure is being built up during starting.

10. In combination, a reservoir for working liquid, a pump which receives liquid from said reservoir and delivers it under pressure, a valve closing the connection between the reservoir and the pump, a valve closing the delivery connection of the pump and interconnected for operation simultaneously with the valve in the inlet connection, means adapted to open both of said valves and controlled by the pressure of the liquid delivered by the pump, and means including the connection between reservoir and pump for holding liquid to be used in feeding the pump.

11. In a liquid pressure system the combination of a reservoir with a plurality of pumps each having an inlet and outlet, a common liquid delivery line connected to the outlet of each of the said pumps, a second liquid line connecting the reservoir to the inlet of one of the pumps, a valve device in the said second liquid line, means associated with the valve device for disconnecting the inlet of the associated pump from the reservoir, means for moving the aforesaid means to connect the pump to the reservoir whenever the pressure at the pump outlet exceeds a certain predetermined value, and means for supplying liquid to the pump when the reservoir is disconnected from the pump inlet.

SYDNEY MACDONALD PARKER.